United States Patent [19]

Bruni

[11] 4,445,228
[45] Apr. 24, 1984

[54] MOTORCYCLE AUDIO SYSTEM

[75] Inventor: James G. Bruni, Glendale, Calif.

[73] Assignee: Yamaha Parts Distributors, Inc., Cypress, Calif.

[21] Appl. No.: 438,303

[22] Filed: Nov. 1, 1982

[51] Int. Cl.³ .............................................. H04B 1/08
[52] U.S. Cl. ...................................... 381/24; 381/86; 455/345; 455/350; 455/351; 181/199
[58] Field of Search ................ 381/86, 24; 179/146 E, 179/146 R; 455/99, 345, 350, 351; 181/199, 150; 362/72

[56] References Cited
U.S. PATENT DOCUMENTS 4,109,105 8/1978 Von Statten, Jr. .............. 455/351 X
4,130,803 12/1978 Thompson ....................... 455/351 X

OTHER PUBLICATIONS

J. C. Whitney & Co. Parts and Accessories Catalogue, 1981 p. 189.

Primary Examiner—G. Z. Rubinson
Assistant Examiner—James L. Dwyer
Attorney, Agent, or Firm—Freilich, Hornbaker, Rosen & Fernandez

[57] ABSTRACT

A stereo audio system for a motorcycle includes a housing (10) for a radio receiver and/or tape deck and speaker-mirror assemblies (11, 12) mounted on base-socket assemblies (13, 14) threaded over mounting posts screwed into tapped holes in place of conventional mirrors on the motorcycle handle bars (15, 16). Crossbars (17, 18) support the housing from the base-socket assemblies. Speakers (11a, 12a) are connected to a power amplifier in the housing by wires which are routed through the base-socket assemblies to the crossbars, and then inside or along the outside of the crossbars to the housing. Mirrors (11c, 12c) occupy half of the housings (11b, 12b) for the speakers.

14 Claims, 12 Drawing Figures

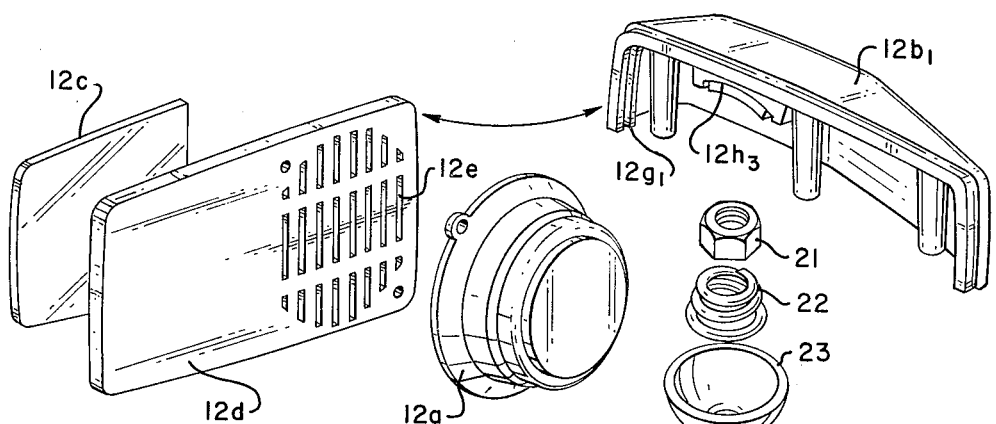
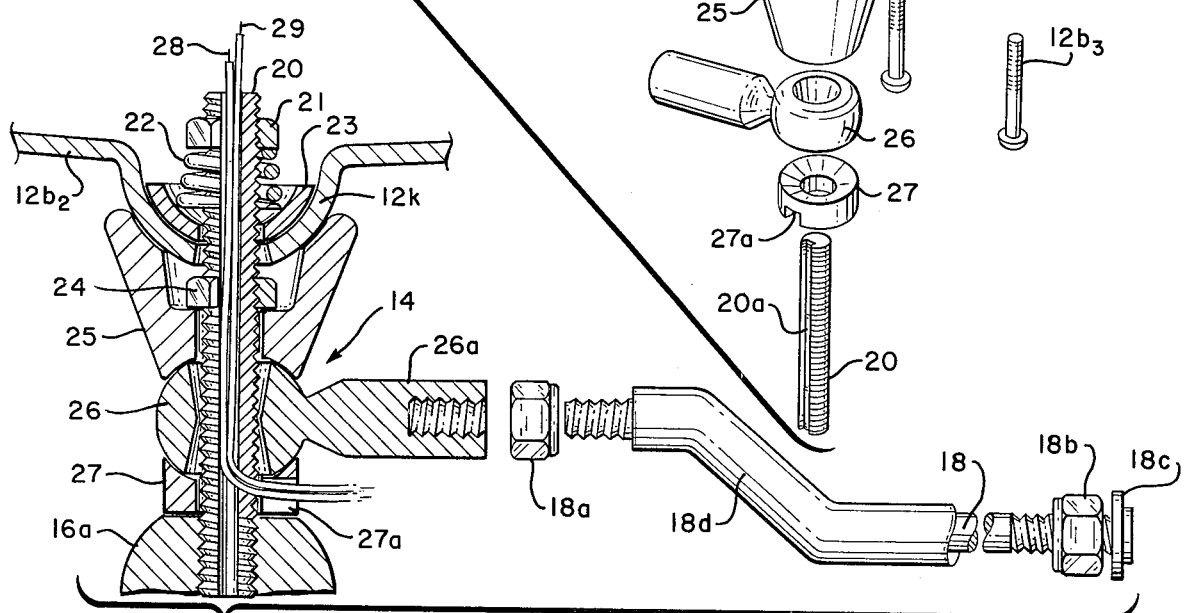
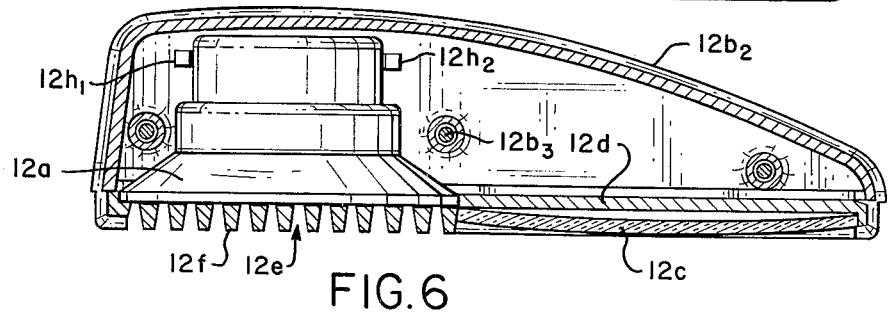

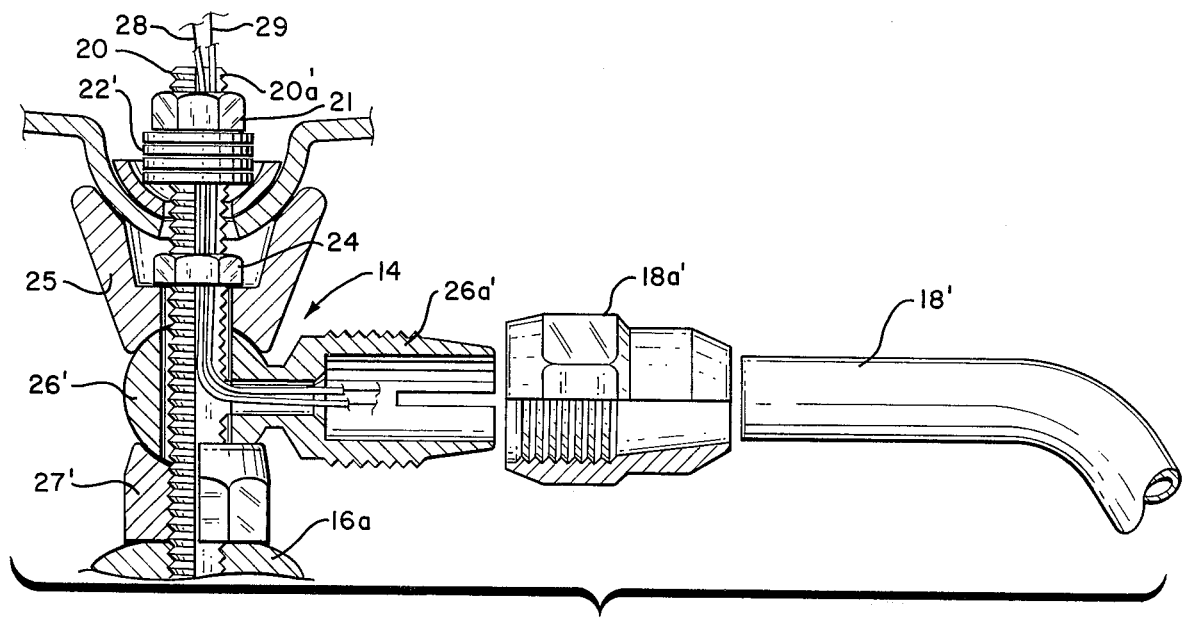
FIG.10
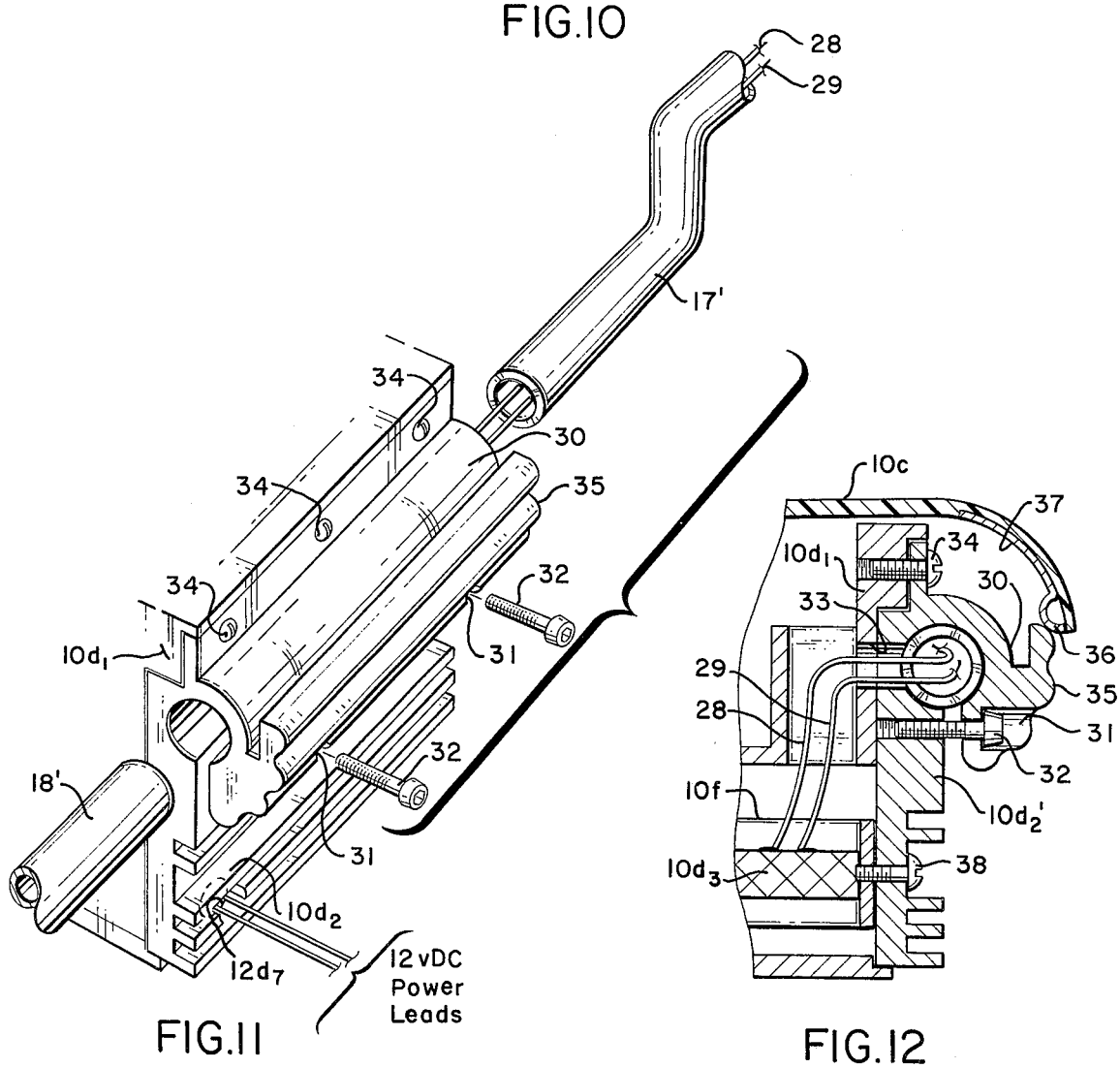
FIG.11
FIG.12

MOTORCYCLE AUDIO SYSTEM

BACKGROUND OF THE INVENTION

This invention relates to an audio system for motorcycles, and more particularly to a stereo system for motorcycles.

In the past, audio systems have been installed on all types of motor vehicles, but usually in just those types that have an enclosure around the person or persons being transported. Audio systems have not heretofore been widely used on motorcycles because of the lack of an enclosure.

Sometimes a shield is mounted in front of the handlebars of a motorcycle to break the wind, and in some cases the shield is provided with fairing along the sides to create a wind-free pocket for the rider. In those cases, an audio system may function effectively, even at high speeds on highways and freeways. However, many motorcyclists prefer not to use a windshield on the motorcycle.

In the absence of a windshield, the rush of wind at high speed makes effective use of an audio system virtually impossible. Some motorcyclists have sought to use a personal audio system of the type having sound transducers placed over the ears, or at the entrances to the ear canals. The motorcyclist may then enjoy an audio system effectively, but at the risk of failing to hear warnings from the surrounding environment. The risk is significant, so much so that in many states it is a violation of the code which governs the operation of motor vehicles to use such personal audio systems while operating a motor vehicle.

OBJECTS AND SUMMARY OF THE INVENTION

It is an object of this invention to provide an effective audio system on a motorcycle, particularly on a motorcycle with no windshield, or a very minimum windshield.

Another object is to provide a stereo audio system on a motorcycle with components positioned for convenience and safety.

Still another object is to provide an audio system designed to mount on a wide variety of motorcycles without alteration.

Yet another object is to provide an audio system designed for assembly in such a sequence as to deter theft by requiring total disassembly.

In accordance with the invention, effective audio entertainment is provided for a motorcycle operator by an audio program unit (radio receiver and/or tape deck) through a speaker-mirror assembly mounted on the motorcycle handlebar in place of a conventional mirror. For stereo entertainment, speaker-mirror assemblies may be mounted on both handlebars. A speaker-mirror assembly is comprised of a speaker housing having a board on the front to support the speaker inside the housing. Slots through the board allow sound waves to be directed from the speaker to the motorcycle operator. Mounted outside of the board, and to one side of the speaker slots, is a mirror which allows the motorcycle operator to look to the rear.

The speaker housing is mounted on a threaded post which is screwed into a tapped hole on the handlebar. Speaker wires are threaded through a longitudinal slot in the post to a point near the handlebar and from there out through a slot in a base-socket support member for routing the wires through or along structure to power amplifiers connected to the audio program unit. A base socket placed over the support member on the post is so shaped in its upper end as to receive a cupped section on the bottom portion of the mirror housing. The base socket is also recessed around the post to allow a jam nut to secure the base socket on the post over the support member. The bottom portion of the speaker housing is separable from its top portion to allow a friction cup, compression spring and hold-down nut to be placed over the mounting post. Then the upper portion of the speaker housing is secured over the lower portion with the speaker board held at the front opening of the housing in slots along the front edges of both portions.

The support member may be provided as a single unit under the base socket, but in order to secure a housing for the audio program unit between the handlebars, the support member is provided as two separate pieces, the second comprising a crossbar ball-joint bracket having an end perpendicular to the post that is adapted to receive a crossbar. Similar crossbars are adjusted in the respective ends of crossbar ball-joint brackets that are placed over mounting posts on both handlebars, but the crossbars are first secured to the housing for the audio program unit and adjusted in length for the distance between posts. Then the ball-joint brackets are placed over the posts. Once the speaker-mirror assemblies are completed, neither this housing nor any of the assemblies can be removed without complete disassembly, thus providing a deterrent to theft.

The audio program unit itself is removably secured in its housing so that it may be taken by the operator when leaving the motorcycle unattended. To facilitate that, the audio program unit is placed on a base and secured thereto by easy unfastening means, such as a Velcro fastener. Secured within the base is a power amplifier for each speaker. A plug-in connector is used to connect input leads of the power amplifiers to the output terminals of the audio program unit. Speaker wires may be routed from the power amplifiers along (inside or outside) the crossbars to the support member of the speaker-mirror assemblies, and through a slot in one of the two separate pieces of the support member to the slot of the threaded post. In a preferred embodiment, the crossbars are preformed and hollow, and the ends of the crossbar brackets are slotted to provide a passage for the speaker wires to be routed through the hollow crossbars. In that manner, the speaker wires may be routed from the power amplifiers to the speakers through the inside of structural members.

Pivoted on the axes of the crossbars is a lid which closes over the audio program unit secured to the base. Position holding means are provided for the lid to hold it open at any position to which it is opened within limits.

While the lid and base may be made of plastic, the back panel to which the crossbars are secured is made of metal, such as cast aluminum, to function as a heat sink for the power amplifiers secured within the base. Fins are provided on the back panel to dissipate the heat into the air more effectively.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 4 is an exploded view of the right hand speaker-mirror and bracket assembly including its mounting bracket.

FIG. 5 is a view partially in section showing an assembled speaker-mirror bracket.

FIG. 6 is a section view of a speaker-mirror taken on line 6—6 in FIG. 1.

FIG. 10 is a view partially in section showing a preferred embodiment of an assembled speaker-mirror bracket.

FIG. 11 is a partial rear view in perspective of a housing for power amplifiers and a radio receiver tape deck showing a preferred manner of securing crossbars to the housing.

FIG. 12 is a sectional view taken on a line 12—12 in FIG. 11.

DESCRIPTION OF PREFERRED EMBODIMENTS

Figure 1:
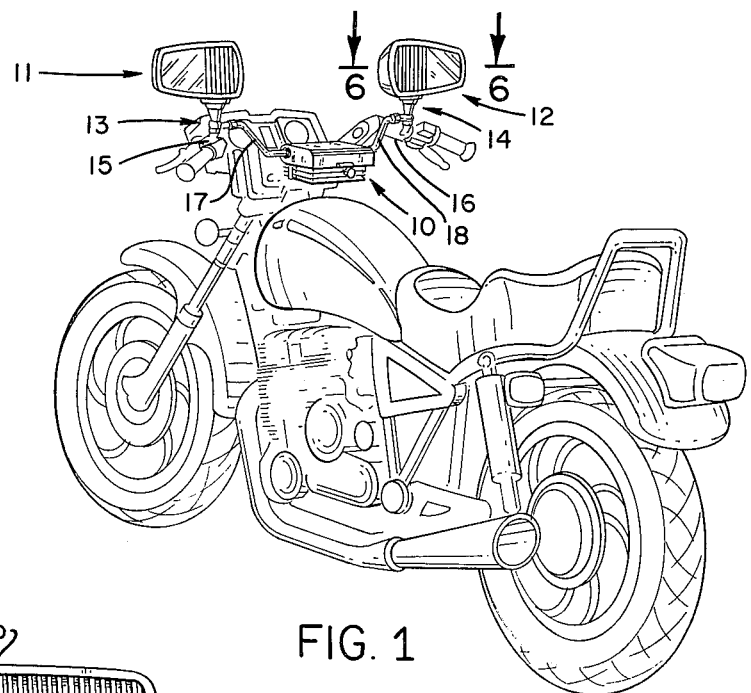
FIG. 1 illustrates in perspective a motorcycle having a stereo audio system installed in accordance with the present invention.
Figure 2:
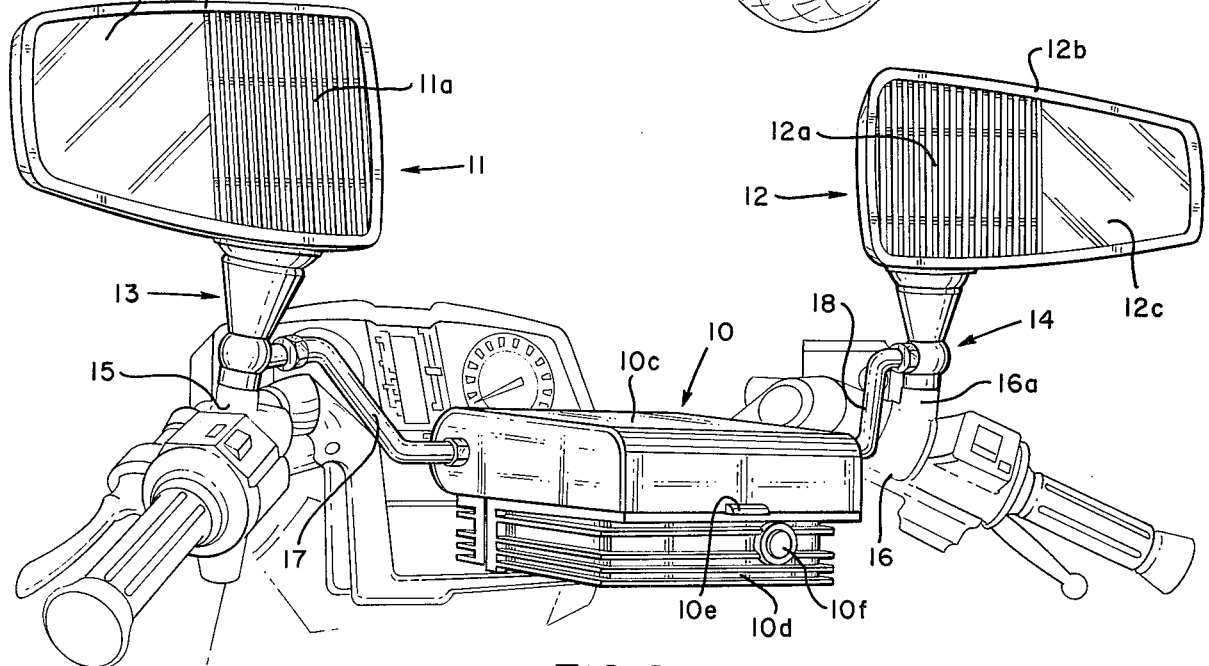
FIG. 2 illustrates in a closer view the manner in which the stereo audio system is mounted on the handlebars of the motorcycle in FIG. 1.

Referring to FIGS. 1 and 2, a stereo audio system is shown mounted on a conventional motorcycle. The audio system is comprised of a radio receiver and/or tape deck in a housing 10, and left and right hand speaker-mirrors 11 and 12 mounted on bracket assemblies 13 and 14. The two speaker-mirrors replace stock mirrors supported on threaded posts screwed into tapped holes in the left and right handlebars 15 and 16, and the housing 10 is supported by crossbars 17 and 18 between the speaker-mirror bracket assemblies 13 and 14.

Figure 3:
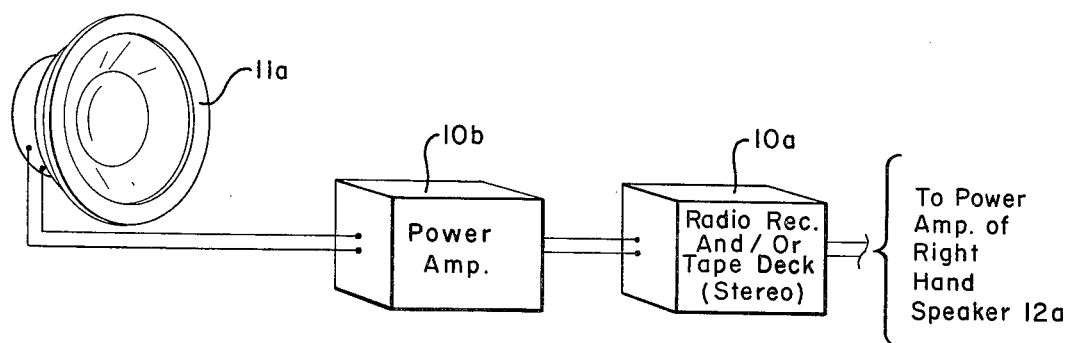
FIG. 3 is a functional block diagram of the left side of the stereo audio system of FIGS. 1 and 2.

FIG. 3 illustrates in a functional block diagram the left side of the stereo audio system comprised of a radio receiver and/or tape deck 10a and power amplifier 10b connected to a speaker 11a. The radio receiver and/or tape deck is similarly connected to a right hand power amplifier and speaker 12a shown in FIG. 4. The speakers 11a and 12a occupy only half of their respective housings 11b and 12b; their other halves hold the mirrors 11c and 12c. Because these mirrors are adjusted for viewing to the rear by the operator of the motorcycle, the speakers are optimally positioned for the operator to listen to an audio program with stereo effect.

A lid 10c over a base 10d of the housing 10 is pivoted on the crossbars 17 and 18. A tab 10e on the lid is used to lift it when access to the housing is desired, such as for tuning the radio supported by the base 10d secured to the crossbars. A push-button 10f may be provided on the front of the base to turn the audio system on and off, or to at least mute the sound when desired or when traffic conditions require that the sound be muted.

The assembly of the right hand speaker-mirror and its mounting bracket will now be described with reference to FIGS. 4, 5 and 6. Referring first to FIG. 4, which shows the assembly in an exploded view, it may be seen that the housing for the speaker 12a and mirror 12c is comprised of an upper shell $12b_1$ and a lower shell $12b_2$ which are secured together by three Phillip-head screws $12b_3$.

The speaker 12a is secured to the back of a board 12d by rivets or screws (not shown). Slots 12e through the board between ribs 12f on the face thereof (shown in FIG. 6) permit sound waves from the speaker to pass through the board. The mirror 12c, which is convex for wide-angle viewing, is bonded into its supported position on the front of the board 12d. The assembled board is placed in a slot 12g of the lower shell $12b_2$, and then the upper shell $12b_1$ is placed with its slot $12g_1$ over the edge of the board 12d. A hold-down strip of rubber $12h_3$ fits over the speaker magnet to hold it down against small rubber blocks (not shown) fitted over the support posts $12h_1$ and $12h_2$, but first the lower shell $12b_2$ is secured as shown in FIG. 5 to the bracket assembly 14 on a mirror mount 16a that is an integral part of the handlebar 16. (See FIG. 1)

The bracket assembly 14 will now be described with reference to FIG. 5., the parts of which are assembled in the order shown in FIG. 4, starting with a threaded mounting post 20 screwed into a tapped hole in the mirror mount 16a, and finishing with a hold-down nut 21 over a spiral compression coil spring 22 (or short stack of spring washers) and friction cup 23. A jam nut 24 secures a base socket 25 over a crossbar ball-joint bracket 26 and spacer 27.

To begin installation, the stock mirror is removed from the mirror mount 16a of the handlebar 16, and the mounting post 20 is screwed in its place. Once the post 20 is in place on the mirror mount 16a of the handlebar 16, insulated speaker wires 28 and 29 are pressed into a longitudinal slot 20a of the post 20. Then the spacer 27 having a radial slot 27a is threaded over the speaker leads and post, and seated on the mirror mount 16a at the base of the post with the slots 20a and 27a optimally aligned for free passage of the speaker wires. Following that, the crossbar bracket 26 and base socket 25 are placed over the post and secured in place by the jam nut 24.

Optimal alignment of the post and spacer requires turning the post 20 and spacer 27 to a position for the slots 20a and 27a to be aligned in order to route the speaker wires 28 and 29 from the speaker to the right hand power amplifier. Although the slot 20a of the post 20 is shown in FIG. 4 and FIG. 5 at an angle of 90° from a tapped end 26a of the crossbar ball-joint bracket 26, in practice it would be aligned with the tapped end, and the slot 27a would also be aligned with the tapped end of the crossbar bracket, as shown in FIG. 5. In summary, the spacer slot 27a is aligned with the post slot 20a, and both are aligned with the crossbar 18 so that the speaker wires 28 and 29 may be routed along the crossbar to the power amplifier in the housing 10.

Before placing the crossbar ball-joint bracket 26 over the post 20, the housing 10 and preformed crossbars 17 and 18 are assembled. Referring to only one side since the other is a mirror image, jam nuts 18a and 18b are screwed on the ends of the crossbar 18, and a lock washer 18c is threaded behind the jam nut 18b. But first a rubber sleeve 18d is slipped over the preformed crossbar 18. Then the crossbar is screwed into the housing 10 and the crossbar bracket 26 is screwed onto the end of the crossbar. The same procedure is followed for the crossbar 17 on the other side. By screwing the crossbars 17 and 18 into or out of the housing, and turning the crossbar brackets at the other ends of the crossbars, the distance the two crossbar brackets is adjusted (reduced or increased) to match the distance between the posts on the handlebars. Both sides are adjusted equally to maintain centering of the housing 10.

Once proper adjustments have been made in the lengths of the crossbars, the housing jam nut 18$b$ on the crossbar 18 is tightened against the lock washer 18$c$. The crossbar and housing assembly is then placed over the posts on the handlebar mirror mounts and the the speaker-mirror bracket assemblies are completed. However, before completing those assemblies, the jam nuts of the base socket and the crossbar are alternately loosened while the positions of the preformed crossbars are adjusted to allow:

1. access to motorcycle ignition area;
2. clearance for gas tank refueling; and
3. reach of the operator to the inside of the housing 10.

Then all jam nuts are tightened firmly.

The ball-joint brackets for the crossbars 17 and 18 allow not only latitude in the position to which the housing 10 is adjusted, but also allow individual hand controls on the handlebars, as well as the handlebars, to be adjusted irrespective of the crossbar assemblies. The hole through the ball-joint, such as of the ball-joint bracket 26 shown in FIG. 5, may be shaped as shown, or otherwise be of sufficient diameter for the bracket to be tilted up or down as much as 15°.

Once the bracket assemblies are complete, as shown in FIG. 5 for the right hand speaker-mirror, the hold-down nuts are tightened until the tension springs are fully compressed. Then the hold-down nuts are backed off one turn for proper compression adjustment of the spiral coil springs to allow the position of the speaker-mirror housings to be adjusted for proper viewing by the operator.

Referring to FIG. 5, it should be noted that the lower shell 12$b_2$ of the speaker housing has a hemispherical cup 12$k$ formed to fit between the friction cup 23 and base socket 25. The speaker-mirror housing is preferably made of plastic while the friction cup, base socket and all other parts of this assembly are made of metal. This assures firm gripping of the speaker-mirror housing in any adjusted position. After the bracket assembly in FIG. 5 has been completed, the speaker-mirror housing is assembled as described above with reference to FIG. 4.

Figure 7:
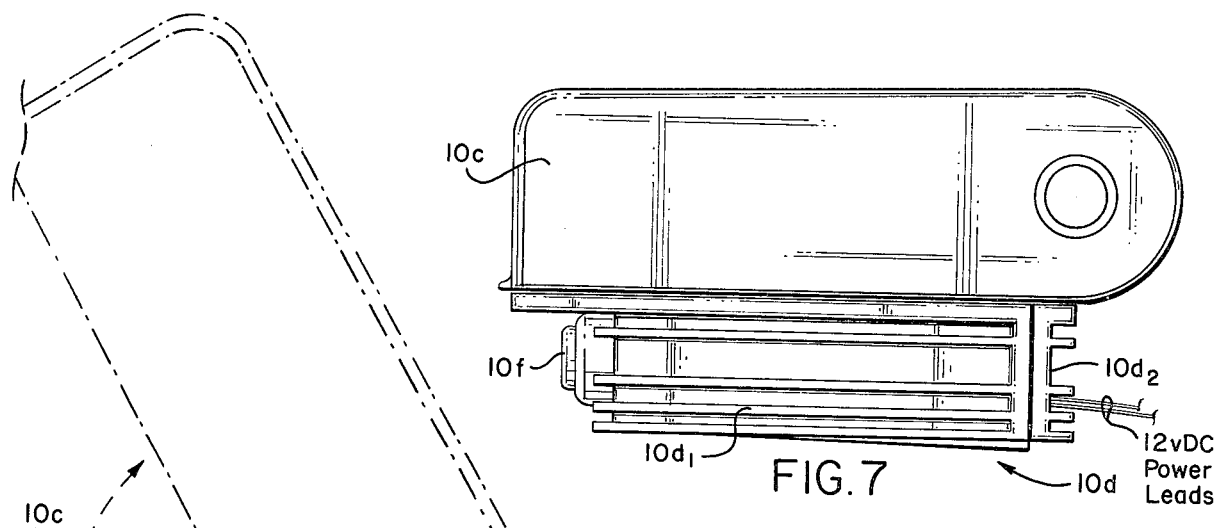
FIG. 7 is a side elevation of a housing for power amplifiers and a radio receiver and/or tape deck in the stereo audio system of FIG. 1.
Figure 9:
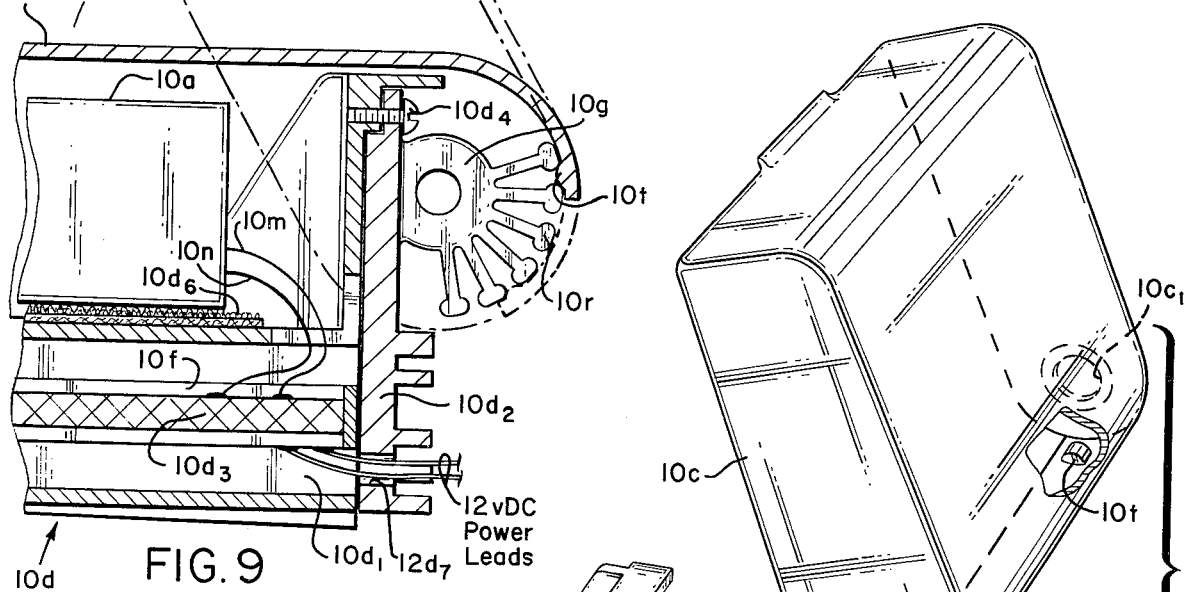
FIG. 9 is a fragmentary sectional view of the housing shown in FIG. 7.
Figure 8:
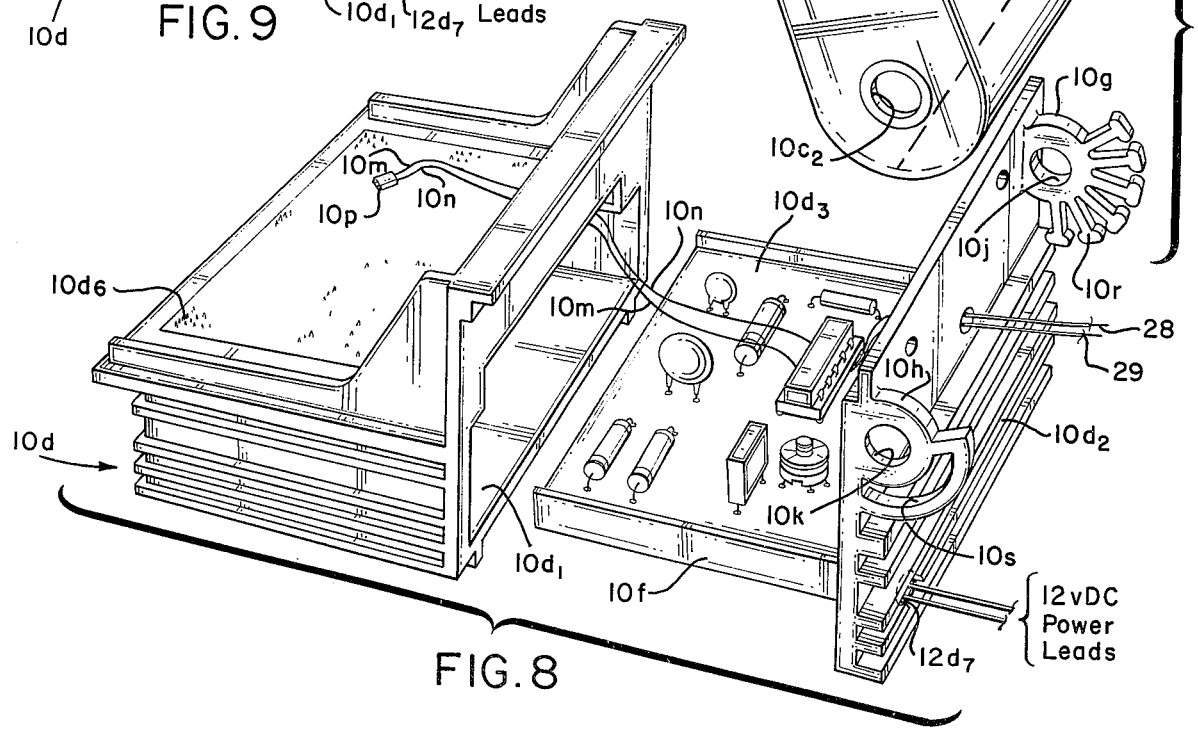
FIG. 8 is an exploded view of the housing shown in FIG. 7.

Referring now to the assembly of the radio receiver and/or tape deck housing 10 shown in FIGS. 7, 8 and 9, the cast aluminum base 10$d$ is comprised of a cabinet 10$d_1$ and back panel 10$d_2$. The power amplifiers for the two speakers are assembled on a circuit board 10$d_3$ that is secured (by screws not shown) perpendicular to the back by a U-shaped bracket 10$f$ so that it can be inserted into the cabinet 10$d_1$ like a drawer. Screws 10$d_4$ secure the back panel 10$d_2$ to the cabinet 10$d_1$. A hole 12$d_7$ is provided to route power leads to the 12 V dc power system of the motorcycle. Both the cabinet 10$d_1$ and the back panel 10$d_2$ serve as a heat sink for the power amplifiers. Consequently, air cooling fins are cast on the outer surfaces of both, as shown in the drawing.

Brackets 10$g$ and 10$h$ are cast perpendicular to the back 10$d_2$ with holes 10$j$ and 10$k$ to receive the crossbars 17 and 18. These holes may be tapped to receive the threaded crossbars, but instead the threads required to receive the ends of the crossbars may be provided by nuts on the inner sides of the brackets, and preferably by a rod (not shown) which fits between the brackets 10$g$ and 10$h$. This rod may be rectangular with a side that fits flush against the back 10$d_2$ between the brackets 10$g$ and 10$h$. Recesses machined in the rod fit over the screws 10$d_4$ that secure the back to the base. With such a rod in place, the housing cannot be opened without complete disassembly of the crossbars in proper sequence. That sequence is such that total disassembly is required before any part of the system can be removed from the motorcycle undamaged. Thus, security for the system is provided by the sequence in which the elements of the system are assembled.

The radio receiver and/or tape deck 10$a$ (shown in FIG. 9) is to be a personal unit secured to the top of the base 10$d$ with a Velcro fastener comprised of two patches of material made of Nylon, or other man-made fiber, one covered with hooks and the other with loops which adhere when pressed together. One patch is cemented to one side of the personal unit, and the other (patch 10$d_6$) is cemented to the top of the base 10$d$. The personal unit 10$a$ is connected to the power amplifiers on the circuit board by twin leads 10$m$ and 10$n$ (shown in FIG. 8) having a suitable plug-in connector 10$p$ on the end. Speaker wires are routed from the circuit board through a hole in the back panel 10$d_2$ of the housing, as shown for the speaker wires 28 and 29 for the right hand speaker.

The patches of the Velcro fastener adhere to each other so effectively that the personal unit 10$a$ will stay in place, even over rough roads, yet pull apart when one end of the unit is lifted under a light steady force. Since the radio receiver and/or tape deck 10$a$ is the heart of the system, security for it is thus assured by the motorcycle operator conveniently taking it when leaving the motorcycle.

The lid or cover 10$c$ is pivoted on the crossbars outside the brackets 10$g$ and 10$h$. So that it will pivot freely when lifted, the pivot holes 10$c_1$ and 10$c_2$ are made of sufficient diameter to fit over spacers between the crossbar jam nuts and the brackets, such as the spacer 18$c$ shown in FIG. 5 for the right hand speaker-mirror. The lid may thus be easily lifted to gain access to the unit secured in the housing by the Velcro fastener. So that it will stay in position to which it is opened, the bracket 10$g$ is provided with fingers 10$r$ engaged by a detent 10$t$, and so that the lid will not open beyond a predetermined limit, a slot 10$s$ is provided in the bracket 10$h$. A stop pin (not shown) is provided inside the lid to fit in the slot 10$s$ of the bracket 10$h$ in a position to engage, as a limit, its ends at the fully opened and fully closed positions.

A second embodiment is disclosed in FIGS. 10, 11 and 12 which utilizes hollow cylindrical members or tubes 17$'$ and 18$'$ for the crossbars. Referring to the right-hand bracket assembly shown in FIG. 10, wherein the same reference numerals are retained for the same parts as in the first embodiment shown in FIG. 5, and primed reference numerals are employed for corresponding but modified parts, the threaded mounting post 20 is secured into the tapped hole in the mirror mount 16$a$ and secured by a jam nut 27$'$ with a quarter-section slot 20$a'$ aligned with the crossbar 18$'$. Once the post is secured in position, crossbar bracket 26$'$ and base socket 25 are secured on the post by the nut 24 with a threaded end 26$a'$ of the bracket 26$'$ aligned with crossbar 18$'$ so that the speaker wires 28 and 29 may be routed through an axial slot in the threaded end 26a' and the slot 20a' in the post.

Before threading the crossbar bracket 26' over the post 20, the housing 10 and preformed crossbars 17' and 18' are assembled, as before, but using a different back panel 10$d_2'$ made of extruded aluminum with a cross section as shown in FIG. 12 to form a clamp 30 which fits over the crossbars. Holes 31 are drilled in the outer side of the clamp for socket-head bolts 32, and threads are tapped in the back panel to receive the bolts on the inner side of the clamp. A large hole 33 is also drilled through the back panel at the center of the clamp to route speaker wires from the power amplifier circuit board 12$d_3$ to the center of the clamp and from there to the speakers through the hollow crossbars. Several screws 34 are used to secure the back panel 12$d_2'$ to the cabinet 12$d_1$. As in the first embodiment, a hole 12$d_7$ is provided for the power leads to the 12 V dc power source of the motorcycle.

The outer side of the clamp 33 is formed with an undulating surface 35 over which a metal detent 36 will ride to hold the lid in any position over a limited range of about 90°. The metal detent, which extends over the full width of the lid 10c, is secured to the lid through a flange 37 bonded to the lid. To assemble the housing 10 with the crossbars about which the lid pivots, the circuit board 10$d_3$ is first secured to the back panel 10$d_2'$ by screws 38 threaded into tapped holes in the U-shaped bracket 10f. Short speaker wires with bullet connectors on the end are then routed through the hole 33 in the back panel. Next the back panel is secured to the cabinet 10$d_1$ with screws 34. Then the crossbars are inserted into the clamp with speaker wire extensions threaded through them. These speaker wire extensions have bullet connectors that mate with the connectors on the short speaker wires extending from the circuit board. The clamp is not cinched down with the bolts 32 until the crossbar brackets are secured to the crossbars, and the lengths of the crossbars are adjusted. Once that is done, the speaker wire extensions are pulled to draw all excess speaker wire into the crossbars.

The crossbar ball-joint brackets are as shown in FIG. 10 for the right hand speaker (as viewed from the front of the motorcycle). The end 26a' is threaded to receive coupling 18a'. The tip of the end 26a' is chamfered and slotted so that the tip will be forced inwardly by the coupling 18a' as the coupling is screwed on the bracket end 26a'. Before the coupling 18a' is tightened on the end 26a' of the crossbar ball-joint bracket 26, the crossarm 18' is inserted into that slotted end of the crossbar bracket. Then as the coupling is forced over the chamfered and slotted end, the slotted end is forced inwardly against the crossbar.

Once the lengths of the crossarms are adjusted in the housing clamp 20, the socket head bolts 32 are tightened and the crossbar brackets are placed over the mounting posts. The speaker-mirror assemblies are then completed using spring washers 22' as an alternative to a spiral compression coil spring.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In an audio system for motorcycles, a speaker-mirror assembly comprised of a speaker-mirror housing and both a speaker and a mirror supported by said speaker-mirror housing mounted on a handlebar of the motorcycle by a bracket assembly, said audio system further comprising a power amplifier and an audio program unit connected through said power amplifier to said speaker, wherein said speaker-mirror housing includes a board mounted in a front opening thereof and said speaker is supported by said board in a position within said housing at one end thereof, said board being slotted in the area over said speaker, and wherein said mirror is mounted over said board on the outside of said speaker-mirror housing at the other end thereof.

2. The combination of claim 1 wherein said speaker-mirror housing is formed with a hemispherical portion on the bottom, and wherein said mounting bracket assembly is comprised of
    a threaded mounting post screwed into a tapped hole in said handlebar,
    a jam nut and a hold down nut,
    a base socket adapted to be placed over said post and shaped at the upper end to receive said hemispherical portion of said speaker-mirror housing, and recessed to receive said jam nut between said hemispherical portion and said base socket,
    a friction cup adapted to be placed over said post and shaped to fit over said hemispherical portion of said speaker-mirror housing, and
    a compression spring between said friction cup and hold down nut.

3. The combination of claim 2 wherein said speaker-mirror housing is divided into separable bottom and top portions to allow said friction cup, compression spring and hold-down nut to be placed over said post to complete a bracket assembly for a speaker-mirror housing before the speaker-mirror housing is completed by placement of the top portion over the bottom portion.

4. The combination of claim 1 including a second speaker-mirror assembly comprised of a housing and both a speaker and a mirror, said speaker-mirror assembly being mounted on the handlebar on the other side of the motorcycle, said audio system further comprising a second power amplifier for said second speaker-mirror assembly, and said audio program unit is a stereo unit having separate leads to the separate power amplifiers.

5. The combination of claim 4 wherein said speaker-mirror assemblies are mounted on handlebars on both sides of the motorcycles with the mounting bracket assembly of each directly below the speaker with the mirror of each speaker-mirror assembly extending outwardly from the motorcycle.

6. The combination of claim 5 wherein said housing for each speaker-mirror assembly is formed with a hemispherical portion on the bottom and wherein each of said mounting bracket assemblies is comprised of
    a threaded mounting post screwed into a tapped hole in the handlebar,
    a jam nut and a hold down nut,
    a base socket adapted to be placed over said post and shaped at the upper end to receive said hemispherical portion of said housing, and recessed to receive said jam nut between said hemispherical portion and said base socket,
    a friction cup adapted to be placed over said post and shaped to fit over said hemispherical portion of said housing, and
    a compression spring between said friction cup and hold down nut.

7. The combination of claim 6 wherein each speaker-mirror housing is divided into separable bottom and top portions to allow said friction cup, compression spring and hold-down nut to be placed over the mounting post to complete a bracket assembly for a speaker-mirror housing before the speaker-mirror housing is completed by placement of the top portion over the bottom portion.

8. The combination of claim 6 or 7 wherein each of said mounting bracket assemblies is further comprised of a crossbar bracket placed over said post beneath said base socket, said combination further including a central housing for said audio program unit and power amplifiers and a crossbar extending from each crossbar bracket to said central housing, one crossbar supporting said central housing on each of said opposing sides.

9. The combination of claim 8 wherein said central housing is comprised of a base for support of said audio program unit and power amplifiers and a lid pivoted on said crossbars for access to said audio program unit.

10. The combination of claim 9 including means for holding said lid steady in a plurality of open positions within limits.

11. The combination of claim 10 wherein said base supports said amplifiers within an enclosure thereof, and supports said audio programming unit on top, wherein said lid is shaped to fit over said audio programming unit, and wherein said audio programming unit is removable by the operator of said motorcycle for security.

12. The combination of claim 11 wherein said audio programming unit is secured to said top of said base by easy release fastening means.

13. The combination of claim 2 or 6 wherein said post is slotted longitudinally to provide a passage for speaker wires from a speaker in a housing supported by a mounting bracket through the mounting bracket to the base thereof.

14. The combination of claim 8 wherein said crossbar bracket of each mounting bracket assembly has a ball-shaped end placed over said post and a hole therethrough adapted to allow the crossbar bracket to be pivoted on said post over a limited angle, said base being shaped with a concave surface at the bottom thereof to fit over said ball-shaped end, and a spacer between said handlebar and said ball-shaped end of said crossbar bracket shaped with a concave surface to fit under said ball-shaped end.

* * * * *